United States Patent
Ozawa

(10) Patent No.: US 8,439,562 B2
(45) Date of Patent: May 14, 2013

(54) ELECTRONIC CLINICAL THERMOMETER ATTACHMENT UNIT AND CONTROL METHOD THEREFOR

(75) Inventor: Hitoshi Ozawa, Chiyoda-ku (JP)

(73) Assignee: Terumo Kabushiki Kaisha, Shibuya-ku, Tokyo (JP)

( * ) Notice: Subject to any disclaimer, the term of this patent is extended or adjusted under 35 U.S.C. 154(b) by 3 days.

(21) Appl. No.: 13/170,373

(22) Filed: Jun. 28, 2011

(65) Prior Publication Data

US 2012/0002699 A1   Jan. 5, 2012

(30) Foreign Application Priority Data

Jun. 30, 2010   (JP) .................................. 2010-150184

(51) Int. Cl.
*G01K 7/00*       (2006.01)
(52) U.S. Cl.
USPC ......................................................... 374/163
(58) Field of Classification Search .................... 374/163
See application file for complete search history.

(56) References Cited

U.S. PATENT DOCUMENTS

| | | | |
|---|---|---|---|
| 2009/0116535 A1* | 5/2009 | Rund | 374/102 |
| 2012/0099617 A1* | 4/2012 | Tseng | 374/152 |

FOREIGN PATENT DOCUMENTS

| | | | | |
|---|---|---|---|---|
| JP | 11248546 A | * | 9/1999 | |
| JP | 2000088660 A | * | 3/2000 | |
| JP | 2000146708 A | * | 5/2000 | |
| JP | 2003-075263 A | | 3/2003 | |

* cited by examiner

*Primary Examiner* — Lisa M. Caputo
*Assistant Examiner* — Jamel Williams
(74) *Attorney, Agent, or Firm* — Buchanan Ingersoll & Rooney PC

(57) ABSTRACT

An electronic clinical thermometer attachment unit, which is configured to be attached to an electronic clinical thermometer, inputs an external sound, determines whether the external sound is a buzzer sound notifying completion of measurement by the electronic clinical thermometer, based on whether the input external sound has a pattern of a buzzer sound notifying completion of the measurement, and performs notification output for notifying a user when it is determines that the external sound is a buzzer sound notifying completion of the measurement.

7 Claims, 4 Drawing Sheets

F I G. 1A
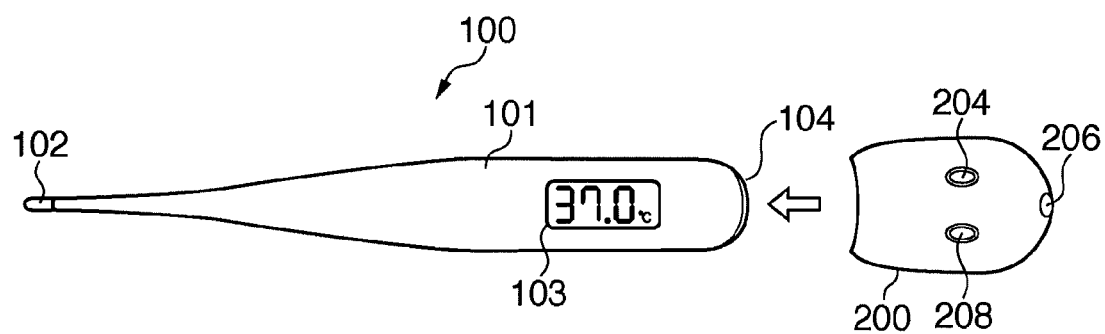
F I G. 1B
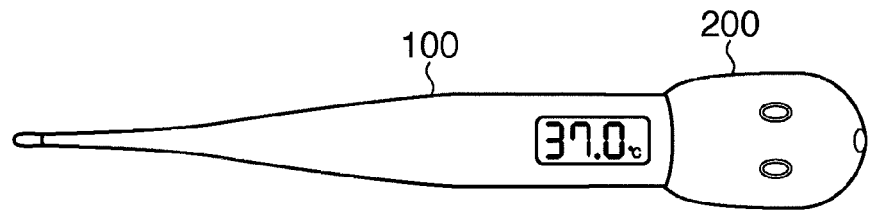

ELECTRONIC CLINICAL THERMOMETER ATTACHMENT UNIT AND CONTROL METHOD THEREFOR

BACKGROUND OF THE INVENTION

1. Field of the Invention

The present invention relates to an electronic clinical thermometer attachment unit which is attached to an electronic clinical thermometer and a control method for the unit.

2. Description of the Related Art

As an electronic clinical thermometer for measuring the body temperature of a user, there is generally known an electronic clinical thermometer which follows the shape of a mercury thermometer and has a temperature sensing unit attached to the distal end portion with an elongated bar-like shape. In general, an electronic clinical thermometer is provided with a display unit which displays a body temperature measurement result and incorporates a buzzer for notifying the user of the completion of measurement (see Japanese Patent Laid-Open No. 2003-075263).

An electronic clinical thermometer is limited to a size that is suitably used under the armpit of the user, and hence does not allow for an increase in the size of electronic components to be mounted in the thermometer. For this reason, a certain limitation is imposed on the size of a buzzer to be mounted in the electronic clinical thermometer, and the buzzer cannot produce a very large volume of sound when the thermometer notifies the completion of measurement. For this reason, when the body temperature of a user in a heavy jacket is measured with a clinical thermometer in the winter season, the user may fail to hear a buzzer sound notifying them of the completion of measurement.

Although it is possible to manufacture an electronic clinical thermometer with high sound pressure, it is for a burden for the user to purchase and replace an electronic clinical thermometer including a buzzer with high sound pressure. In addition, when a plurality of users use the same electronic clinical thermometer, some users may feel uncomfortable with the loud notifying sound produced by the buzzer. Existing electronic clinical thermometers are therefore required to be able to notify users reliably of the completion of measurement when outputting the notification (with a buzzer sound in general), by outputting it at a higher sound pressure, and performing such notification as needed.

SUMMARY OF THE INVENTION

The present invention has been made in consideration of the above problem, and, according to its exemplary embodiment, an attachment unit which can be used while being attached to an electronic clinical thermometer and can more reliably notify the user of the completion of measurement is provided.

In order to achieve the above object, an attachment unit according to an aspect of the present invention has the following arrangement. That is, there is provided an electronic clinical thermometer attachment unit which is configured to be attached to an electronic clinical thermometer, the unit comprising: a sound input unit configured to input an external sound; a determination unit configured to determine, based on whether the external sound input by the sound input unit has a pattern of a buzzer sound notifying completion of measurement by the electronic clinical thermometer, whether the external sound is a buzzer sound notifying completion of the measurement; and an output unit configured to perform notification output for notifying a user when the determination unit determines that the external sound is a buzzer sound notifying completion of the measurement.

Other features and advantages of the present invention will be apparent from the following description taken in conjunction with the accompanying drawings.

BRIEF DESCRIPTION OF THE DRAWINGS

FIGS. 1A and 1B are views showing the outer arrangements of an electronic clinical thermometer and attachment unit according to an embodiment;

DESCRIPTION OF THE EMBODIMENTS

Figure 2:
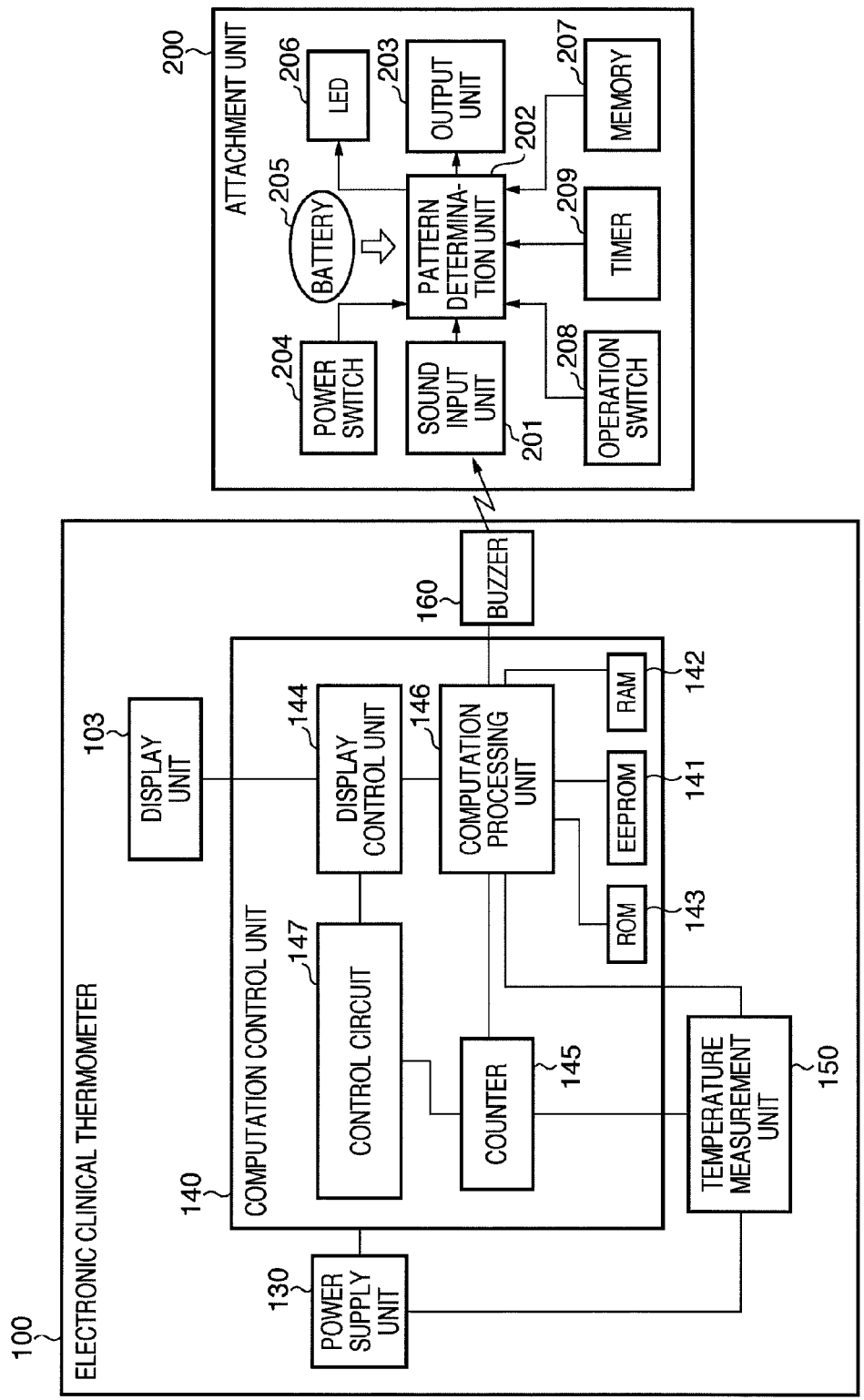
FIG. 2 is a block diagram showing an example of the arrangements of the electronic clinical thermometer and attachment unit according to the embodiment.

A preferred embodiment of the present invention will be described below with reference to the accompanying drawings.

First Embodiment

FIGS. 1A and 1B are views showing the outer appearances of an electronic clinical thermometer 100 and electronic clinical thermometer attachment unit 200 according to this embodiment. As shown in FIGS. 1A and 1B, the attachment unit 200 can be attached to a distal end 104 on the side opposite to a metal cap 102 of the electronic clinical thermometer 100. Although FIGS. 1A and 1B show an arrangement in which the attachment unit 200 is attached to the electronic clinical thermometer 100 so as to cover the distal end 104, the present invention is not limited to this. For example, when the attachment unit 200 is to be attached to the battery-replaceable electronic clinical thermometer 100 with the distal end 104 of a housing 101 forming a battery lid, the attachment unit 200 may be attached in place of the battery lid.

The housing 101 is formed from a thermoplastic resin such as an anti-shock ABS resin. The housing 101 is provided with a display unit 103 for displaying a body temperature measurement result or the like. In addition, the tip of the housing 101 is provided with the metal cap 102 liquid-tightly incorporating a temperature detection element such as a thermistor. The display unit 103 includes a window portion formed from a transparent thermoplastic resin and an LCD provided in the window. The window portion of the display unit 103 and the housing 101 are preferably formed into a liquid-tight structure by two-color molding or the like. Referring to the attachment unit 200, reference numeral 204 denotes a power switch; 206, an LED which shows an operation state; and 208, an operation switch for accepting a user instruction. These units will be described in detail later.

FIG. 2 is an internal block diagram showing the arrangements of the electronic clinical thermometer 100 and attachment unit 200 according to this embodiment. The electronic clinical thermometer 100 includes a temperature measurement unit 150, a computation control unit 140, a power supply unit 130, and a buzzer 160.

The temperature measurement unit 150 includes a thermistor, capacitor, and temperature measurement CR oscillation circuit, and outputs the temperature detected by the thermistor as an oscillation signal. A counter 145 counts output oscillation signals to output the result as a digital amount. Note that the arrangement of the temperature measurement unit 150 is an example, and the present invention is not limited to this.

The computation control unit 140 includes an EEPROM 141 which stores parameters necessary for body temperature measurement, a RAM 142 for storing measured temperatures in chronological order, a ROM 143 storing a prediction type body temperature measurement program and the like, a display control unit 144 for controlling the display unit 103, the counter 145 which counts oscillation signals output from the temperature measurement unit 150, a computation processing unit 146 which performs computation based on parameters stored in the EEPROM 141 in accordance with the body temperature measurement program in the ROM 143, and a control circuit 147 which controls the counter 145 and the display control unit 144.

The buzzer 160 produces a sound to notify the user of the completion of body temperature measurement processing by the computation processing unit 146.

A sound input unit 201 of the attachment unit 200 has a function as a microphone for inputting external sounds such as a sound output from the buzzer 160. A pattern determination unit 202 analyzes the pattern of the sounds input by the sound input unit 201. The pattern determination unit 202 determines, based on this analysis result indicating whether the input sound has a specific pattern, whether the input sound is a buzzer sound output from the buzzer 160 of the electronic clinical thermometer 100 and notifying the completion of measurement. If the pattern determination unit 202 determines that the input sound is a buzzer sound notifying the completion of measurement, an output unit 203 generates an output for notifying the user of the corresponding information. For example, the output unit 203 generates a buzzer sound with a sound pressure higher than that of a sound output from the buzzer 160 of the electronic clinical thermometer 100. Alternatively, it is possible to record and set a specific pattern used for pattern determination. This makes it possible to cope with the notifications of the completion of measurement in various types of clinical thermometers.

The power switch 204 is provided at a position on the attachment unit 200 which allows user operation, as shown in, for example, FIGS. 1A and 1B. In this embodiment, pressing the power switch 204 for a predetermined period of time will turn on the power of the attachment unit 200. Note that the location of the power switch 204 is not limited to a position on the attachment unit 200 which allows user operation. For example, the power switch 204 may be placed at a position where the switch is turned on when the attachment unit 200 is attached to the electronic clinical thermometer 100, as shown in FIG. 1B.

A battery 205 is a power supply for supplying power to each unit of the attachment unit 200. The LED 206 keeps on during the operation of the attachment unit 200. A memory 207 stores information for driving the output unit 203 in a plurality of types of output forms. If, for example, the output unit 203 can output sounds in different pitches, it is possible to register the information of a plurality of kinds of melodies and the information of sound generation patterns (sound patterns). The operation switch 208 is used when the user selects one of such output forms. Obviously, the function of selecting an output form using the memory 207 and the operation switch 208 is an option, but is not an essential function, that is, the output unit 203 may perform notification in a single output form. The attachment unit 200 shifts to a standby state when it cannot detect any buzzer sound indicating the completion of measurement in the electronic clinical thermometer 100 within a predetermined period of time (for example, 5 min) after the attachment unit 200 is powered on by the operation of the power switch 204. A timer 209 measures this elapsed period. Note that the standby state is a state in which the attachment unit 200 can accept only the operation of the power switch 204. This state will also be referred to as a power off state hereinafter.

When the output unit 203 outputs a buzzer sound by using a piezoelectric element in the above case, it is possible to use the piezoelectric element as a microphone in the sound input unit 201. Using the common piezoelectric element as both a microphone and a buzzer can achieve reductions in the size, weight, and cost of the attachment unit 200. Note, however, that one piezoelectric element cannot be simultaneously used as a microphone and a buzzer. For this reason, the piezoelectric element is time-divisionally used such that, for example, it is used as a microphone for periods other than those during which it generates buzzer sounds. Obviously, the sound input unit 201 and the output unit 203 may respectively use a microphone and a piezoelectric element. If the sound input unit 201 and the output unit 203 are formed from discrete components, the output unit 203 need not always be contained in the attachment unit 200. That is, it is possible to form the output unit 203 as an external unit separately from the attachment unit and to connect the pattern determination unit 202 in the attachment unit 200 to the output unit 203 as the external unit via a wire or wirelessly.

Figure 3:
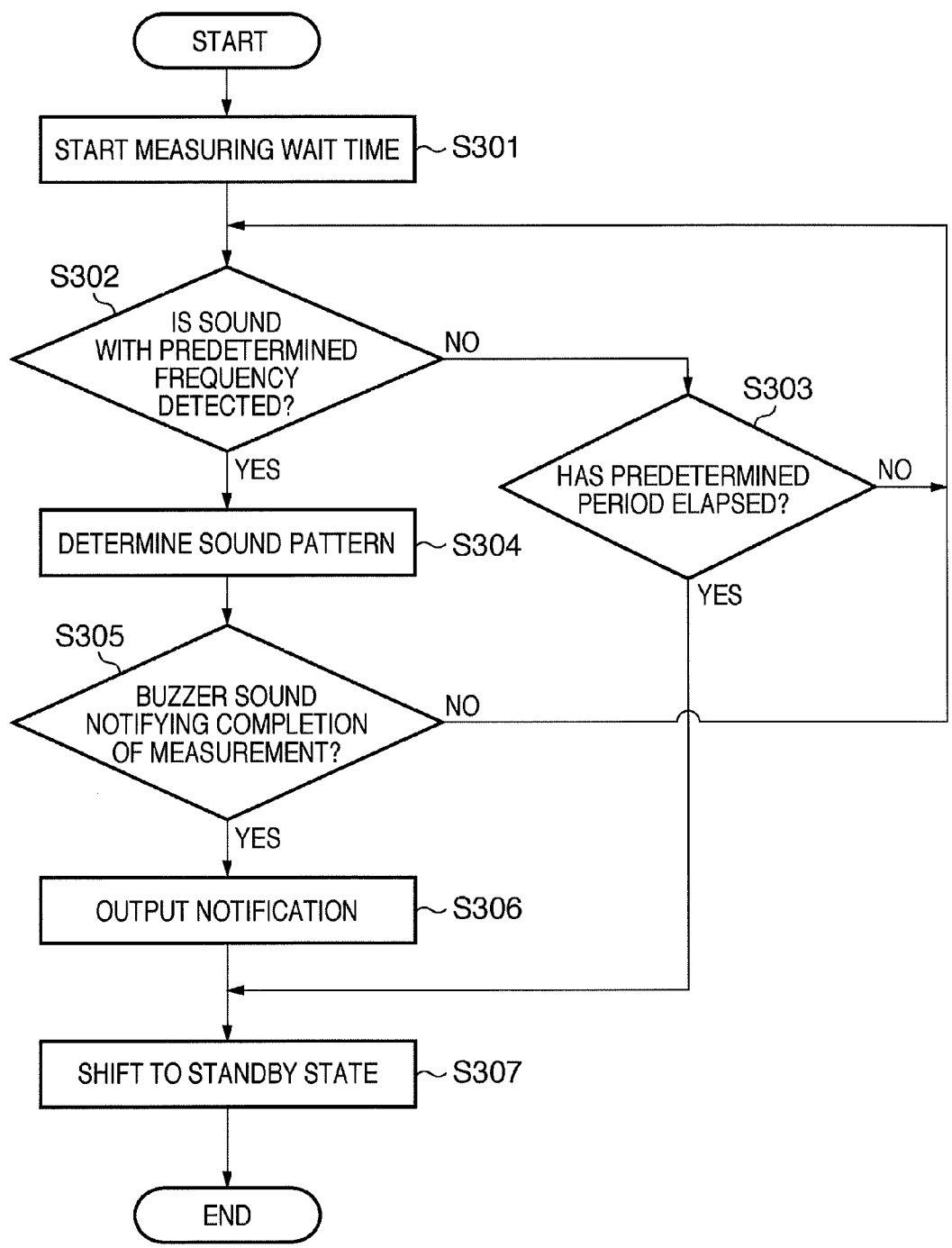
FIG. 3 is a flowchart for explaining the operation of the attachment unit according to the embodiment.

The operation of the attachment unit 200 according to this embodiment which has the above arrangement will be described below. FIG. 3 is a flowchart for explaining the operation of the attachment unit 200. When the attachment unit 200 is powered on by pressing the power switch 204 for a predetermined period of time, the LED 206 is turned on, and the processing shown in FIG. 3 is started.

In step S301, the timer 209 starts to measure the wait time. In step S302, the pattern determination unit 202 determines whether a sound with a predetermined frequency output from the buzzer 160 of the electronic clinical thermometer 100 is input via the sound input unit 201. If no sound with the predetermined frequency is input, the process advances to step S303. In step S303, the pattern determination unit 202 determines whether the timer 209 has timed up. If the timer has not timed up, the process returns to step S302. If the pattern determination unit 202 determines in step S303 that the timer has timed up, the pattern determination unit 202 determines that no notification of the completion of measurement has been detected within a predetermined elapsed time, and performs power supply control to shift the attachment unit 200 to the standby state (step S307). As described above, for example, 5 min is set as the predetermined elapsed time, which is a sufficient time for the general prediction type electronic clinical thermometer 100 to complete body temperature measurement. If, therefore, no notification of completion is detected over this time, it can be thought that the attachment unit 200 has failed to detect a notification or is left unused. It is therefore possible to save unnecessary power consumption by performing such power supply control. Note that when the attachment unit 200 shifts to the standby state after the lapse of the predetermined period, the output unit 203 may perform some kind of notification output like "no notification of completion can be detected".

Figure 4:
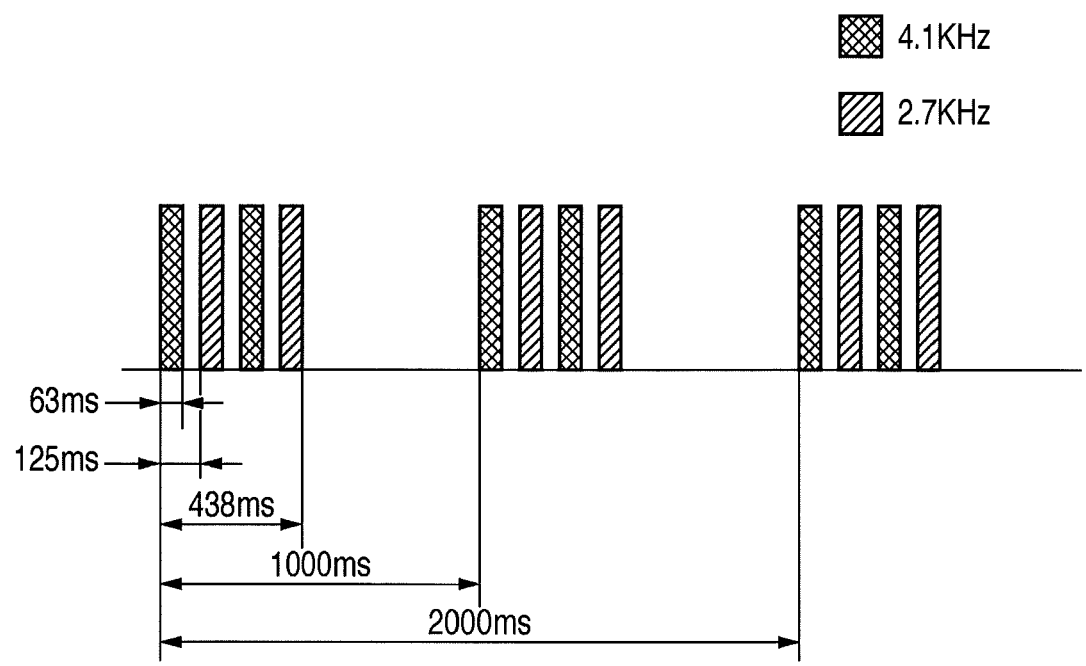
FIG. 4 is a view for explaining an example of a buzzer sound pattern for the notification of the completion of measurement from the electronic clinical thermometer, which is detected by the attachment unit.

If a sound with the predetermined frequency is detected in step S302, the process advances to step S304. In step S304, the pattern determination unit 202 analyzes the sound continuously input via the sound input unit 201, and determines whether the sound is a buzzer sound indicating the notification of the completion of measurement which is generated by the buzzer 160. FIG. 4 shows an example of the pattern of buzzer sounds output from the buzzer 160 of the electronic clinical thermometer 100 when notifying the completion of measurement. Assume that as shown in FIG. 4, the buzzer 160 in this embodiment outputs, three times at the timings shown in FIG. 4, a pattern including a 4.1-kHs buzzer sound and a 2.7-kHz buzzer sound for 63 ms which are alternately output twice at intervals of 125 ms. Upon detecting a 4.1-kHz sound at the start of this pattern as a sound with the predetermined frequency (step S302), the pattern determination unit 202 analyzes whether the pattern of the subsequent buzzer sounds coincides with the pattern shown in FIG. 4 (step S304). Obviously, the sound pattern shown in FIG. 4 is an example, and the present invention is not limited to this. What matters is that it is possible to determine whether the pattern of external sounds input via the sound input unit 201 coincides with the pattern of sounds output to notify the completion of body temperature measurement in the electronic clinical thermometer 100 to which the attachment unit 200 is to be attached.

If the pattern determination unit 202 determines in step S304 that the pattern of input sounds coincides with the pattern of buzzer sounds for notifying the completion of measurement, the process advances from step S305 to step S306. In step S306, the pattern determination unit 202 drives the output unit 203 to notify the user of the completion of body temperature measurement. Thereafter, in step S307, the pattern determination unit 202 turns off the LED 206 and shifts the attachment unit 200 to the standby state (power off state).

If the pattern determination unit 202 determines in step S305 that the input sounds are not buzzer sounds for notifying the completion of measurement, the process returns to step S302 to repeat the above processing.

As described above, the attachment unit 200 of this embodiment automatically detects a buzzer sound notifying the completion of measurement from the electronic clinical thermometer 100, and outputs a buzzer sound or a melody with a volume larger than that of the detected buzzer sound. Even if, therefore, the user in a heavy jacket lying under a blanket measures his/her body temperature with the electronic clinical thermometer 100, he/she can recognize the notification of the completion of measurement more reliably. In addition, since the attachment unit 200 is formed discretely from the electronic clinical thermometer 100, it is possible to implement more reliable notification of the completion of measurement without applying any changes to conventionally existing electronic clinical thermometers.

Note that the output unit 203 may be configured to be able to adjust the sound volume in this embodiment. For example, the output unit 203 can be configured to change the sound volume level stepwise every time the user presses the operation switch 208. Assume that every time the user changes the sound volume level by pressing the operation switch 208, the output unit 203 generates a sound with the sound volume at the changed level. In this case, the user can quickly grasp the set sound volume. This provides convenience for the user. If output forms such as those using melodies and sound patterns can be switched as described above, it is possible to switch the selected state with the operation switch 208 and to make the output unit 203 output a newly selected melody or sound pattern. This allows the user to quickly grasp the selected output state, thus providing convenience for the user.

In addition, in the above embodiment, the output unit 203 outputs sounds. However, the present invention is not limited to this. For example, it is possible to notify the completion of measurement by using vibrations, light (illumination), and the like. It is possible to perform notification with combinations of a plurality of types of output forms like sound and vibration, sound and light, and vibration and light. In addition, it is possible to prepare sound, vibration, light, and the like as a plurality of types of output forms and allow the user to select a desired output form (one of the plurality of output forms or a combination of them) with the operation switch 208.

In addition, the above embodiment aims at buzzer sounds (sound patterns) for notifying the completion of body temperature measurement by the electronic clinical thermometer 100. However, it is possible to detect buzzer sounds (sound patterns) associated with other types of notifications, instead of or in addition to the above buzzer sounds for notifying the completion of measurement, and make the output unit 203 execute notification output. If, for example, the electronic clinical thermometer 100 fails to measure due to an error caused by some factor, an alarm is generated by using a specific buzzer sound pattern. It is therefore possible to make the output unit 203 execute notification output upon detection of a specific buzzer sound corresponding to such an alarm. Furthermore, in this case, it is preferable to implement different forms of notification output (change sound generation patterns or switching sounds and vibrations) depending on whether to notify the completion of body temperature measurement or generate an alarm.

The present invention provides an attachment unit which can be used while being attached to an electronic clinical thermometer and can more reliably notify the user of the completion of measurement by the electronic clinical thermometer.

The present invention is not limited to the above embodiments and various changes and modifications can be made within the spirit and scope of the present invention. Therefore, to apprise the public of the scope of the present invention the following claims are made.

This application claims the benefit of Japanese Patent Application No. 2010-150184, filed Jun. 30, 2010, which is hereby incorporated by reference herein in its entirety.

What is claimed is:

1. An electronic clinical thermometer attachment unit which is configured to be attached to an electronic clinical thermometer, the unit comprising:
    a sound input unit configured to input an external sound;
    a detection unit configured to detect a frequency of the external sound input by said sound input unit and on-off pattern of the external sound;
    a determination unit configured to determine, based on a detection result of the detection unit, whether the external sound indicates a predetermined notification performed by the electronic clinical thermometer; and
    an output unit configured to perform notification output for notifying a user of the predetermined notification when said determination unit determines that the external sound indicates the predetermined notification performed by the electronic clinical thermometer.

2. The unit according to claim 1, wherein said output unit performs notification output by using at least one of a sound, light, and vibration.

3. The unit according to claim 1, further comprising a piezoelectric element,
    wherein said sound input unit inputs an external sound by using said piezoelectric as a microphone, and said output unit performs notification output by using said piezoelectric as a buzzer.

4. An electronic clinical thermometer attachment unit which is configured to be attached to an electronic clinical thermometer, the unit comprising:

a sound input unit configured to input an external sound;

a determination unit configured to determine, based on whether the external sound input by said sound input unit has a pattern of a buzzer sound notifying completion of measurement by the electronic clinical thermometer, whether the external sound is a buzzer sound notifying completion of the measurement;

an output unit configured to perform notification output for notifying a user when said determination unit determines that the external sound is a buzzer sound notifying completion of the measurement;

a memory in which a plurality of types of output forms are registered; and a selection unit configured to select one of the plurality of types of output forms in accordance with a user instruction;

wherein said output unit performs output for the notification in an output form selected by said selection unit.

5. An electronic clinical thermometer attachment unit which is configured to be attached to an electronic clinical thermometer, the unit comprising:

a sound input unit configured to input an external sound;

a determination unit configured to determine, based on whether the external sound input by said sound input unit has a pattern of a buzzer sound notifying completion of measurement by the electronic clinical thermometer, whether the external sound is a buzzer sound notifying completion of the measurement;

an output unit configured to perform notification output for notifying a user when said determination unit determines that the external sound is a buzzer sound notifying completion of the measurement;

a power switch configured to set the attachment unit in a power on state; and a power supply control unit configured to shift the attachment unit to a power off state when no buzzer sound notifying completion of the measurement is input within a predetermined period after the power on state is set by operating said power switch.

6. A control method for an electronic clinical thermometer attachment unit which is configured to be attached to an electronic clinical thermometer, the method comprising:

a sound input step of inputting an external sound;

a determination step of determining whether the external sound is a buzzer sound notifying completion of the measurement;

an output step for performing notification output for notifying a user when it is determined in the determination step that the external sound is a buzzer sound notifying completion of the measurement; and a selecting step of selecting one of a plurality of types of output forms in accordance with a user instruction, wherein the plurality of types of output forms are registered in a memory;

wherein, in the output step, output for the notification is performed in an output form selected in the selecting step.

7. A control method for an electronic clinical thermometer attachment unit which is configured to be attached to an electronic clinical thermometer, the method comprising:

a sound input step of inputting an external sound;

a determination step of determining whether the external sound is a buzzer sound notifying completion of the measurement;

an output step for performing notification output for notifying a user when it is determined in the determination step that the external sound is a buzzer sound notifying completion of the measurement; and a power supply control step of shifting the attachment unit to a power off state when no buzzer sound notifying completion of the measurement is input within a predetermined period after a power on state is set by operating a power switch.

* * * * *